Dec. 9, 1958     H. R. KARLEN     2,863,650
BEVERAGE AGITATOR
Filed Jan. 4, 1955
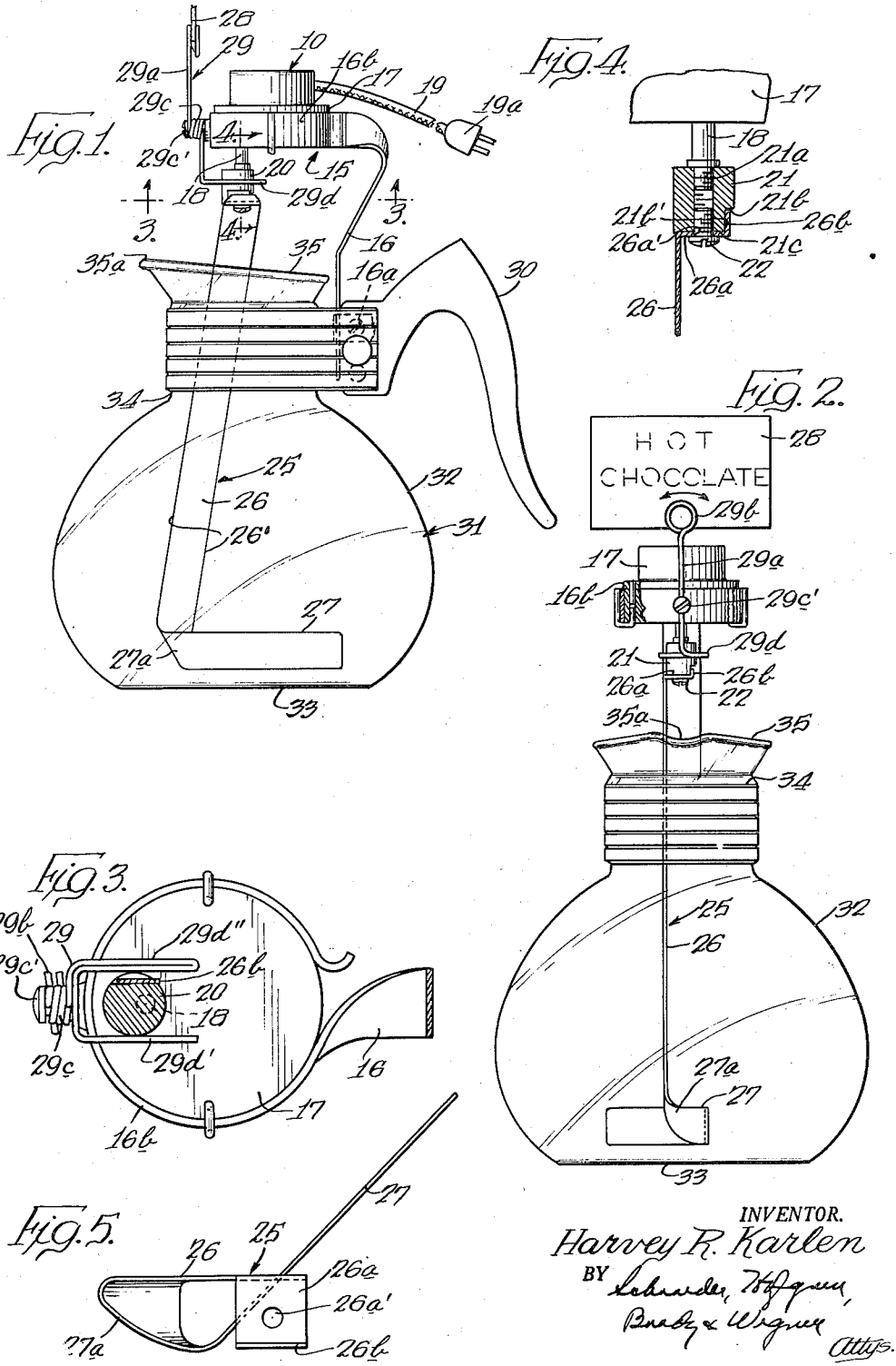
INVENTOR.
Harvey R. Karlen United States Patent Office 2,863,650
Patented Dec. 9, 1958

2,863,650

BEVERAGE AGITATOR

Harvey R. Karlen, Chicago, Ill., assignor to Cory Corporation, a corporation of Delaware Application January 4, 1955, Serial No. 479,821

8 Claims. (Cl. 259—108)

This invention relates to a beverage agitator and, in particular, to a stirrer-type agitator adapted for the constant stirring of beverages to prevent undesirable settling and coagulation of the materials suspended in the fluid.

Many forms of beverage decanters are known in the art, a very common type being that comprising a generally spherical housing formed of metal such as stainless steel, or of glass, provided with a flat bottom for placement on a suitable heating means and a restricted or necked top having an outer opening or mouth provided with a pouring spout. A handle is generally provided being secured to the decanter by suitable clamp means grasping the necked portion.

Such decanters are widely employed commercially for brewing and serving beverages such as coffee and hot chocolate. When beverages such as hot chocolate or others, wherein the materials suspended in the fluid tend to settle or coagulate, are to be retained in such decanters for a protracted period, it is highly desirable to provide means for constantly agitating or stirring the beverage to prevent these undesirable effects. The means presently known in the art have several serious disadvantages. In those agitators using spoon-like stirring means, it is found that insufficient stirring is provided in the upper portion of the beverage, resulting in a non-homogeneous mixture. Where flat paddles are used, they are generally arranged to provide comparable stirring action along their entire length so that an unnecessary amount of stirring is produced in the upper portion of the beverage in order to obtain the required amount of stirring in the lower portion where the materials tend to collect. Further, the means found in the art are costly of manufacture and generally comprise combinations of complex gearing and eccentrics to provide non-linear movements of the stirring devices.

It is the principal object of my invention, therefore, to provide a new and improved beverage agitator for use with a decanter-type container.

A further object is to provide such an agitator which may be readily mounted on the handle of such a decanter and which will allow the pouring of the beverage from the decanter without removing the agitator.

A still further object of the invention is to provide a non-comminuting agitator or stirrer having a unidirectionally rotating drive means mounted on the decanter handle and an agitator blade coupled to the drive means and arranged to provide a gradually increasing stirring action in a downward direction, with a paddle element at the lower end of the blade adapted to provide a substantially greater stirring action.

Another object is to provide such an agitator blade and paddle in an integral structure arranged to produce an upward scoop effect.

Still another object of the invention is to provide an agitator of the character described having means for oscillatorily mounting a display card thereon.

Other features and advantages of this invention will be apparent from the following description taken in connection with the accompanying drawings wherein:

Fig. 1 is a side elevational view of a beverage decanter provided with a beverage agitator embodying this invention;

Fig. 2 is a front elevational view thereof;

Fig. 3 is an enlarged sectional view taken approximately along the line 3—3 of Fig. 1;

Fig. 4 is an enlarged fragmentary sectional view taken approximately along the line 4—4 of Fig. 1; and Fig. 5 is a plan view of the agitator blade.

Referring now to the drawings and, in particular to Figs. 1 and 2, the beverage agitator generally designated 10, may be seen to be mounted on a handle 30 which is secured by suitable clamp means to an open top decanter 31. The decanter comprises a generally spherical receptacle portion 32 having a flattened bottom 33 adapted for resting engagement on a heating element or a flat surface (not shown). Extending upwardly from the receptacle portion 32 is a neck 34 terminating in a mouth 35. The first edge, or the edge opposite that adjacent to the handle 30, of the mouth is provided with a pouring spout 35a.

Beverage agitator 10 comprises generally a drive means 15 secured to the handle 30 by a support 16. Connected to the drive member by a coupling 20 is the agitator blade 25 arranged to extend downwardly through the decanter mouth and neck into the interior of the receptacle portion 32. Mounted on the front end of the drive means 15 is a display card holder 29 arranged further to have movable contact with the coupling 20.

Drive 15 comprises a generally cylindrical electric motor and gear assembly 17 having an outwardly extending drive shaft 18. The motor and gear assembly 17 is supported in a vertical position, with the drive shaft extending vertically downwardly, by the support 16 which comprises a generally flat bar having one end secured to the handle 30 by screws 16a and the opposite end bent at right angles to the first end and formed into a clamp 16b engaging and retaining motor and gear assembly 17. An electrical connection cord 19 is electrically secured to the motor and provided with a suitable plug 19a for connection to an available power receptacle.

Coupling 20, as best seen in Figs. 3 and 4, comprises a cylindrical block 21 fixedly secured to the end of shaft 18 by the threaded engagement of the shaft with the block in a longitudinal hole 21a eccentrically disposed in the block. As hole 21a is thus positioned in axial alignment with the shaft 18, the outer periphery of the block 21 provides an eccentric cam surface, the co-operation of which with the display card holder 29 will be later described.

A notch 21b, having a chordal surface 21b', is provided at one end of the block 21 said block end terminating in a radially extending surface 21c.

My agitator blade 25 is of a novel construction and functions in a manner heretofore unknown in the art. A first blade portion 26 comprising a flat, thin, elongated member is provided at one end with a securing portion 26a arranged to extend perpendicular to the lateral plane of portion 26. An end portion 26b is upstanding from portion 26a, being bent at right angles thereto so as to lie in a plane parallel to that of portion 26. Portion 26b is adapted to be received in notch 21b in abutment with chordal surface 21b'. Disposed centrally of securing portion 26a in a hole 26a' through which a screw 22 is inserted to engage the block in hole 21a, thereby to fixedly secure the agitator blade to the coupling block 21; screw 22 prevents any longitudinal movement of the blade relative to the block and the abutment of end portion 26b with the surface 21b' prevents any rotational movement therebetween. Thus arranged, the blade portion 26 is spaced from the axis of rotation of the drive shaft 18 at some distance; in the embodiment shown, this distance is of the order of one-half the blade portion width. Further, every point on agitator blade 25 will follow a circular path when drive shaft 18 is rotated with the agitator blade so attached.

While the lateral plane of blade portion 26 extends parallel to the axis of the drive shaft 18, edges 26' of the blade portion are further disposed angularly to the drive shaft axis as may best be seen in Fig. 1. Therefore, the upper end portion of the blade generally defines a chord relative to the circular path described by it during movement, whereas the lower portion generally defines a radially, inwardly extending portion which is generally perpendicular to the direction of its movement. Such arrangement allows the upper portion to move through the beverage surrounding it with a preponderantly knife-like action and a minimized paddle action. As the lower end is further removed from the longitudinal axis of the drive shaft 18, its motion through the beverage surrounding it will be preponderantly paddle-like in that the broad side of the blade will be presented foremost in the direction of motion of the blade. As the blade extends angularly downwardly, this change in the quality of the agitating or stirring effect will be gradual between the two ends of the blade portion 26. It may be seen, thusly, that because of the unique construction of my agitator blade I obtain a gradually increasing stirring or agitating effect in the downward direction of the agitator blade. Such functioning is most desirable for the stirring of beverages where the particles tend to settle downwardly, thus requiring greatest stirring effect in the lower portion of the receptacle and yet where some stirring effect is desirable in the upper portion for reasons such as prevention of coagulation.

At the lower end of blade portion 26 and preferably formed integrally therefrom is provided a horizontally extending paddle portion 27. As best seen in Figs. 1, 2 and 5, portion 27 is arranged to extend angularly through the lateral plane of portion 25, and parallel to decanter bottom 33. Its movement through the beverage produces a preponderantly paddle-like effect so as to augment the stirring of the beverage in the bottom portion of the decanter receptacle 32. As the paddle 27 is disposed asymmetrically to the drive shaft axis, asymmetrical beverage currents are produced, thereby preventing the mere continuous motion of the beverage in a circular path within the receptacle and, instead, providing a turbulent, agitating-type stirring action. The paddle 27 is secured to the blade portion 26 by a connecting end 27a having a scoop, upwardly directed configuration tending to urge upwardly any of the beverage passing over its inner surface, thereby assisting in the redistribution of the particles through the beverage.

Pivotally secured to the front portion of the motor and gear assembly 17 is display card holder 29 comprising a vertically extending spring wire member 29a formed into a clip 29b at its upper end to which any suitable display card 28 may be secured. Member 29 is further provided with a looped or curled mid-portion 29c through which a screw 29c' is passed and secured to the drive member 15 to allow the pivotal movement thereon of the holder 29. Extending perpendicularly to the member 29a and depending from its lower end is U-shaped portion 29d having spaced parallel legs 29d' and 29d'' adapted to slidingly engage the outer periphery of coupling 20. As indicated previously, the coupling is eccentrically carried on the drive shaft 18 so that the outer periphery thereof forms an eccentric cam surface. The rotation of the coupling, therefore, causes the U-shaped portion 29d to oscillate in a plane perpendicular to the drive shaft axis, which oscillatory motion will be transmitted to the display card 28 through the vertical member 29a. As the drive shaft and agitator mechanism is driven at a relatively low rate of speed, a waving and jiggling effect is produced on the display card having desirable advertising attraction appeal.

To install my agitator, it is merely necessary to secure the end of the support 16 by screws 16a to the decanter handle 30 so that the drive shaft 18 of the drive member 15 extends vertically downwardly and the agitator blade mechanism 25 extends through the mouth and neck of the decanter into the receptacle portion 32. The electrical cord plug 19c is then connected to a source of electrical current to cause unidirectional rotation of the motor and gear assembly 17, drive shaft 18 and the agitator blade mounted thereon. The action of the agitator blade is such as to stir the beverage contained in the decanter with a gradually increasing agitating effect from the upper portion of the beverage downwardly and with a maximized agitating effect produced by the depending paddle portion 27 in the bottom portion of the receptacle 32. The scoop 27a acts to direct currents of fluid upwardly, further effecting a turbulent redistribution of the suspended particles. At the same time, the display card holder will be activated by the cam action of the coupling 20 so as to wave or oscillate the display card 28 secured thereto.

My beverage agitator provides means for improved stirring of a beverage which is economical and simple of manufacture and which may be readily installed and removed from the standard forms of decanters presently known in the art. The mechanism may be readily disassembled for cleaning purposes and the drive mechanism is of simple construction requiring minimum maintenance.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. For use in a beverage container, means for agitating beverage contained therein, comprising: motor drive means provided with a drive shaft; an agitator blade provided with a blade portion having an end connected to the drive shaft and arranged to extend the blade portion in a plane spaced from and parallel to the axis of the drive shaft, and a paddle portion extending angularly from the blade portion and arranged to extend in a plane parallel to the axis of the drive shaft and through the plane of the blade portion and be spaced from the drive shaft axis to produce an asymmetrical motion of beverage surrounding the paddle relative to the drive shaft axis, whereby a portion of the beverage is moved toward the drive shaft axis, and another portion of the beverage is moved away from the drive shaft axis.

2. For use in a beverage container, means for agitating beverage contained therein, comprising: drive means including a downwardly extending drive shaft at the top of the container; an elongated, straight, flat blade; and means for securing one end of the blade to the drive shaft to extend the blade generally downwardly in the container, said means being arranged to so position the blade as to cause the upper portion of the blade to cut edgewise circumferentially around the drive shaft axis, and the lower portion of the blade to paddle sidewise circumferentially around the drive shaft axis by positioning the blade in a plane spaced from said axis and extending perpendicular to a radial plane of said axis, the longitudinal edges of the blade extending at an acute angle to said radial plane.

3. In a beverage agitator having a motor drive means provided with a drive shaft and an agitator blade, means for operatively connecting the blade to the shaft comprising: a cylindrical connector block provided with a threaded, longitudinal bore therethrough, and a notch having a longitudinal surface extending in a plane parallel to the block axis and spaced therefrom adapted to engage a portion of the agitator blade; and a stud insertable into one end of said bore to be in axial, fixed relationship with the drive shaft and having an outer end provided with a shoulder adapted to engage the agitator blade and secure the agitator blade to the block, the other end of the bore being adapted to receive the end of the drive shaft for fixed, threaded engagement therewith, for securing the blade in fixed relationship with said shaft.

4. A beverage agitator comprising: a rotatable drive shaft; a flat, thin, elongated blade; and means for operatively connecting said blade to said shaft arranged to position the flat plane of said blade parallel to the axis of said shaft and spaced therefrom a distance less than the width of the blade portion, and with said blade extending longitudinally at an acute angle relative to a plane in which said axis lies and which is perpendicular to the flat plane of said blade.

5. Means for agitating a surrounding beverage, comprising an agitator blade movable about an axis of rotation, said blade having an elongated, flat blade part extending generally longitudinally of, and in a plane spaced from, and parallel to, said axis of rotation, said blade part extending longitudinally at an acute angle relative to an axial plane drawn perpendicular to the plane of the blade part, whereby a portion of the blade part adjacent said axial plane moves edge foremost around said axis, and a portion of the blade part spaced from said axial plane moves flat side foremost around said axis, said blade further having an elongated, flat paddle part extending laterally of, and in a plane spaced from, and parallel to, said axis of rotation, said paddle part extending longitudinally perpendicularly to an axial plane drawn perpendicular to the plane of the paddle part, whereby the entire paddle part moves flat side foremost around the axis of rotation, with one portion thereof acting to urge surrounding beverage toward the axis of rotation, and another portion thereof acting to urge surrounding beverage away from the axis of rotation.

6. The means of claim 5 wherein the axis is vertical, and the upper end of the blade part is adjacent the axial plane, whereby the upper portion of the surrounding beverage is cut, and the lower portion of the surrounding beverage is paddled by said blade part.

7. The means of claim 6 wherein the paddle part extends from the lower end of the blade part, whereby the agitation of the surrounding beverage adjacent the lower end of the agitator blade results from the only paddle action of the paddle part and the adjacent blade part.

8. Means for agitating a surrounding liquid, comprising: an agitator blade movable in an arcuate path about a vertical axis, said agitator blade having an elongated flat blade part extending longitudinally generally vertically in a first vertical plane spaced from said axis; an elongated, flat paddle part; and means connecting one end of the paddle part to the lower end of the blade part to extend the paddle part horizontally in a second vertical plane which plane passes through the first plane between said vertical axis and the lower end of the blade part.

References Cited in the file of this patent

UNITED STATES PATENTS

| | | |
|---|---|---|
| 419,631 | Brown | Jan. 21, 1890 |
| 668,686 | Marshall | Feb. 26, 1901 |
| 1,435,289 | Gilbert | Nov. 14, 1922 |
| 1,681,076 | Wohl | Aug. 14, 1928 |
| 1,723,022 | Farrington | Aug. 6, 1929 |
| 1,740,709 | Parker et al. | Dec. 24, 1929 |
| 1,926,655 | Shaw | Sept. 12, 1933 |
| 2,203,672 | Chester | Jan. 11, 1940 |
| 2,530,858 | Cerniak | Nov. 21, 1950 |
| 2,610,424 | Willard | Sept. 16, 1952 |